United States Patent [19]

Myers

[11] 4,106,540

[45] Aug. 15, 1978

[54] ANTI-VIBRATION THREAD INSERT

[75] Inventor: William D. Myers, Fullerton, Calif.

[73] Assignee: Microdot, Inc., Greenwich, Conn.

[21] Appl. No.: 813,679

[22] Filed: Jul. 7, 1977

[51] Int. Cl.² .................................................. F16B 39/30
[52] U.S. Cl. ...................................................... 151/14 CS
[58] Field of Search ................ 151/14 CS, 14 R, 22; 85/32 CS, 64, 46

[56] References Cited

U.S. PATENT DOCUMENTS

| 964,062 | 7/1910 | Seddon | 151/14 CS |
| 1,817,295 | 8/1931 | Dardelet | 151/14 R |
| 1,828,856 | 10/1931 | Bridges | 151/14 R |
| 1,905,869 | 4/1933 | Hoke | 151/14 R |
| 2,672,070 | 3/1954 | Forster | 85/32 CS |

Primary Examiner—Ramon S. Britts

Attorney, Agent, or Firm—Harness, Dickey & Pierce

[57] ABSTRACT

A locking thread insert is wound from wire which is drawn to a generally diamond-shaped cross-section. The wound wire is coiled to a predetermined diameter preferably slightly larger than the diameter of a threaded hole in a female member in which the insert is to be disposed. The threaded screw is free-running in the insert until a predetermined magnitude of loading is encountered at which time a locking and anti-vibration interaction occurs between the crest of the male thread on the screw and the insert. The crest of the male thread is radially compressed when moved axially and circumferentially so as to positively resist loosening under vibration. The interaction between the insert and screw also positively seats and locks the insert in the female member.

3 Claims, 5 Drawing Figures

U.S. Patent
Aug. 15, 1978
4,106,540
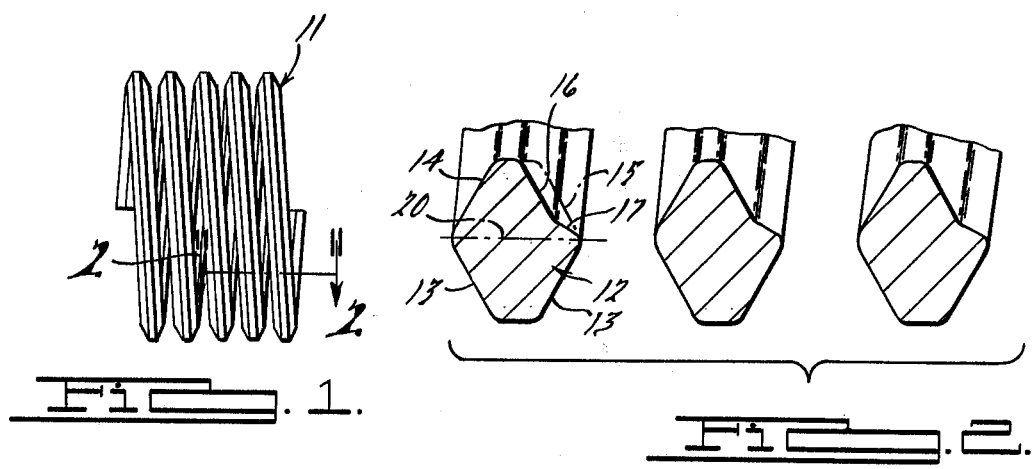
FIG. 1.
FIG. 2.
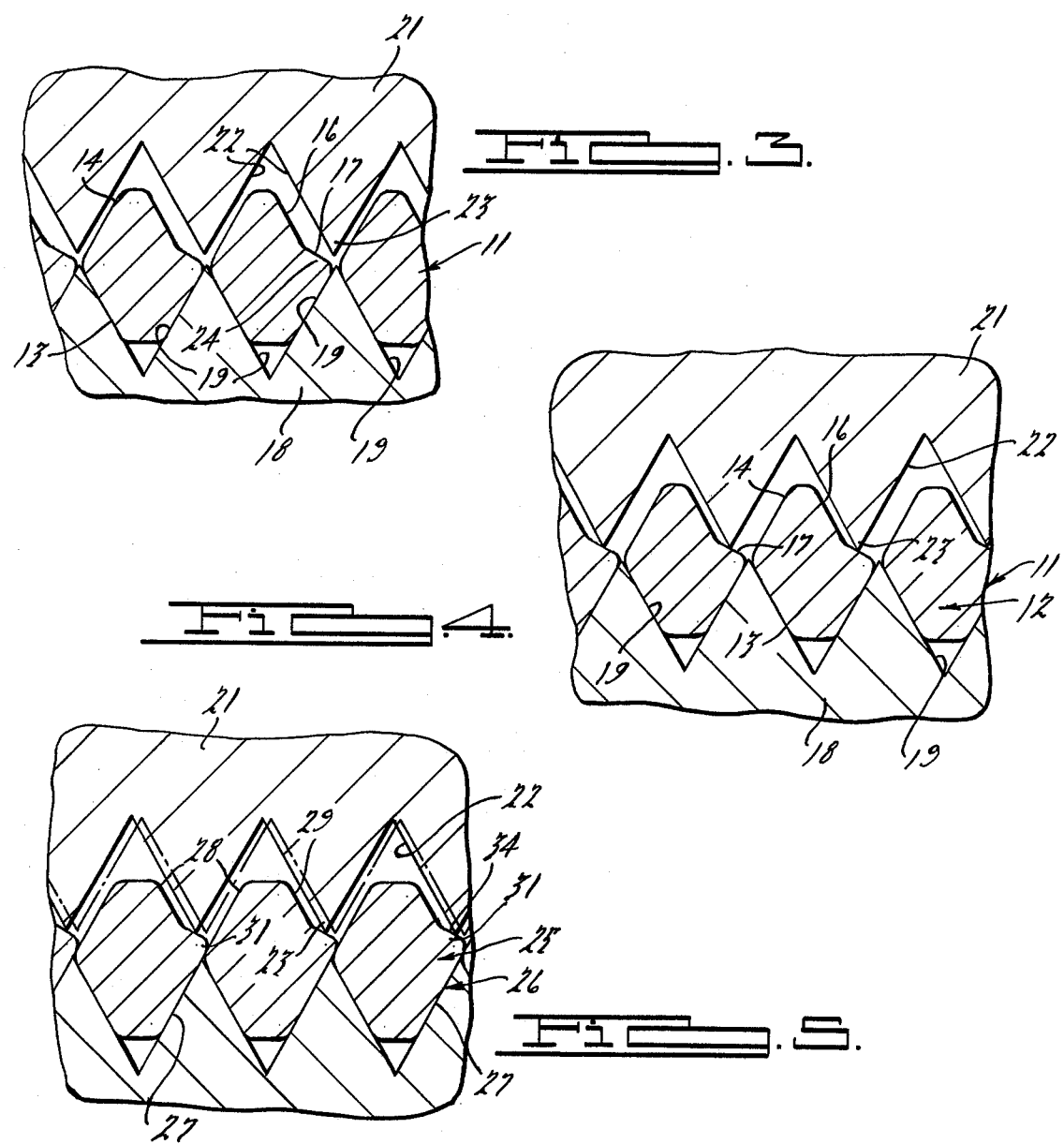
FIG. 3.
FIG. 4.
FIG. 5.

ANTI-VIBRATION THREAD INSERT

BACKGROUND OF THE INVENTION

Various types of thread inserts are known in the art and generally comprise a drawn wire which is thereafter coiled and inserted in a threaded aperture in a female member. Such inserts are taught in U.S. Pat. Nos. 3,444,915 and 3,459,248. Locking of the end of a male thread with a similar thread of a female element having a lip is disclosed in a British Pat. No. 335,598 of Sept. 25, 1930 and U.S. Pat. No. 2,091,788.

SUMMARY OF THE INVENTION

The invention pertains to the drawing of wire into a generally diamond-shaped section having one face provided with a sloping ramp. The ramp is drawn in the wire in the conventional wire-forming operation. The ramp may be formed outwardly of one face of the conventional thread form or may be formed inwardly thereof by offsetting one of the radially inwardly extending faces of the thread section. After the wire is drawn to the desired cross-section, it is formed into a coil on a conventional coil winding machine to a diameter which is sightly larger than the diameter of the thread in an aperture in a female member. The insert is advanced into the thread of the female member in the conventional manner such as by a tang on the forward end thereof which is engaged by a tool and rotated to advance the coils into the thread. The tang may be left in the radial position if sufficient turns are provided to accommodate the length of a male member or the tang may be removed in the conventional manner. When the male member is threaded into the insert, it will be free-running therein until a load is encountered whereupon engagement of the crest of the thread of the male member with the sloping ramp applies an increasing radial load on the male thread which prevents loosening of the male thread due to vibration and positively seats the insert in the female member.

BRIEF DESCRIPTION OF THE DRAWINGS

FIG. 1 is a view of a coiled wire insert embodying features of the present invention;

FIG. 2 is an enlarged sectional view of the structure illustrated in FIG. 1, taken on the line 2—2 thereof;

FIG. 3 is a view of the wire insert illustrated in FIG. 2 shown assembled in a female element and with the thread of a male member freely rotatable therewithin;

FIG. 4 is a view of the structure illustrated in FIG. 3 when the thread of the male member is in loaded and locked condition; and FIG. 5 is a view of structure, similar to that illustrated in FIG. 4, showing another form of the invention.

DESCRIPTION OF THE PREFERRED EMBODIMENT

A coiled insert 11 is illustrated in FIG. 1 which is helically wound from wire illustrated in the enlarged sectional view of FIG. 2. A section 12 of the drawn wire has radially outer thread faces 13 and a radially inner thread face 14. Conventionally, the section 12 has a radially inner face 15 shown by the dot and dash line.

In accordance with the instant invention, a radially inner face 16 is provided with a ramp 17 at the bottom thereof which slopes at approximately 30° to the line 20 parallel to the axis of the insert 11.

After the wire has been drawn to provide the side face 16 and ramp 17, it is wound into the helical coil 11 illustrated in FIG. 1 with an outer diameter which is slightly larger than the root diameter of the thread in a female member 18 into which the insert 11 is to be advanced. As seen in FIG. 3, the female member 18 has thread faces 19 therein with which the outer thread faces 13 of the insert 11 mate. The helical coil 11 frictionally engages the threads 19 of the female member, advancement thereinto being accomplished as by a tang (not shown).

As illustrated in FIG. 3, a male member 21 has a thread 22 which is free-running between the thread faces 14 and 16 until a load is encountered. Thereafter the male member 21 moves relatively to the left of the insert 11 until the crest 23 of the thread 22 thereon engages the sloping surface 17 of a ramp 24 throughout the length of the engaged portion of the thread. This provides a radially inward compressive force on the crest of the thread of the male member which produces a substantial holding force to prevent lateral movement of the male member 21 due to vibration. The compressive force on the crest of the thread of the male member is illustrated in FIG. 4 with the side of the thread 22 spaced from the face 16 of the wire inset 11.

In FIG. 5, a slightly different form of the invention is illustrated wherein a wire 25 of an insert 26 has outer thread faces 27 when coiled and inner thread faces 28 and 29. An extension 31 lies at the junction of the face 29 with the face 27 to define a ramp 34. The thread 22 of the male element 21 will be free-running until a load is engaged whereupon the crest 23 thereof engages the ramp 34 thereby to provide a radial holding force which prevents the male member from movement due to vibration.

Moreover, as in the embodiment shown in FIG. 4, engagement of the thread crest 23 of the male element 21 with the ramp 34 forces the faces 27 of the insert 26 into positive seating engagement with the complimentary thread in the female member in contradistinction to the force relationship between the male element and a conventional insert wherein the male element tends to twist the insert out of engagement with the female element.

While it will be apparent that the invention herein disclosed is well calculated to achieve the benefits and advantages as hereinabove set forth, it will be appreciated that the invention is susceptible to modification, variation and change without departing from the spirit thereof.

What is claimed:

1. A coiled wire insert for insertion in a threaded female member comprising a preformed wire of generally diamond-shaped cross-section, said wire being formed into a coil having an outer thread form complimentary to the flank angles of and mateable with the thread of a female member and an inner thread, one face of the inner thread having a ramp at the thread root between the convolutions of said insert and angled at approximately 30° to the central axis of said insert, the crest of the thread on a male member thread being engageable with the ramp on said insert when said male member is axially loaded whereby a radially inward compressive force is exerted on said male member to minimize vibration and effect locking thereof and a radially outward compressive force is exerted on said insert generally parallel to the adjacent thread flank of said female member to lock the radially outer threads thereof in said female member and minimize twisting of said thread form relative to said female member.

2. A coiled wire insert as recited in claim 1, wherein said ramp is disposed axially inwardly of said diamond-shaped cross-section.

3. A coiled wire insert as recited in claim 1, wherein said ramp is disposed axially outwardly of said diamond-shaped cross-section.

* * * * *